United States Patent
Elings et al.

[15] 3,647,284
[45] Mar. 7, 1972

[54] OPTICAL DISPLAY DEVICE

[72] Inventors: Virgil B. Elings, 958 Isleta; Caliste J. Landry, Clingstone Painted Cave, Star Route, both of Santa Barbara, Calif. 93105

[22] Filed: Nov. 30, 1970

[21] Appl. No.: 93,608

[52] U.S. Cl............................350/294, 35/58, 206/45.34, 272/8 D, 272/8 M, 350/55
[51] Int. Cl......................................................G02b 17/06
[58] Field of Search..................350/294, 293, 288, 296, 55; 272/8 M, 8 D, 8 R; 35/58; 206/45, 34

[56] References Cited

UNITED STATES PATENTS

| 995,607 | 6/1911 | Kempinski............................272/8 M |
| 2,628,533 | 2/1953 | Oetjen........................................350/55 |

FOREIGN PATENTS OR APPLICATIONS

| 747,917 | 10/1944 | Germany..............................350/294 |

OTHER PUBLICATIONS

"Arc Image Furnace System" 36(6) Review of Scientific Instruments 747- 749 (6-1965)

*Primary Examiner*—David Schonberg
*Assistant Examiner*—John W. Leonard
*Attorney*—Harry W. Brelsford

[57] ABSTRACT

A pair of concave mirrors are placed with their concave sides toward each other and one is optically apertured, either with a hole in the mirror or by an unsilvered portion in a mirror of transparent material. An object placed at the mirror that is not apertured will project a real image at the region of the aperture if the curvature and spacings of the mirrors are correct. The image may be left-right reversed or may have the same orientation as the object depending upon the reflective paths of rays from the object. The image may be magnified or reduced in size depending upon curvatures and spacings of the mirrors.

6 Claims, 10 Drawing Figures

PATENTED MAR 7 1972

INVENTOR.
CALISTE J. LANDRY
VIRGIL B. ELINGS
BY
H. W. Brelsford
ATTORNEY

INVENTOR.
CALISTE J. LANDRY
VIRGIL B. ELINGS
BY H.W. Brelsford
ATTORNEY

PATENTED MAR 7 1972 3,647,284

INVENTOR.
CALISTE J. LANDRY
VIRGIL B. ELINGS
BY H.W. Brelsford
ATTORNEY 3,647,284

OPTICAL DISPLAY DEVICE

Our invention relates to display devices and has particular reference to a mirror arrangement for creating a real image in space of the object being displayed.

Many optical arrangements have been devised over the centuries for creating a real image of various objects; that is, to create an image in space without the help of a screen, ground glass or similar image-revealing device. These have taken the form of various arrangements of concave mirrors and sometimes mirrors and lens combinations. Most of these have proven to be awkward to handle and difficult to use effectively.

We have discovered that if a centrally apertured mirror is used, it can be combined with another mirror to cause a real image of an object placed between the mirrors to be projected through the aperture. The image may appear in space at the aperture, or just below it, or may appear above the aperture. The image may be smaller than the object or may be magnified, depending upon the curvatures of the mirrors used. At least one, and preferably both, of the mirrors should be concave.

The display arrangement is well suited for the display of valuable objects such as jewelry because the object itself can be placed under glass, out of reach of an acquisitive viewer. The image shows the object in its true three-dimensional form, making visible the top, bottom and sides of the object. Thus, a complete visual inspection can be made of the object without the viewer directly ever seeing the object. The object may be illuminated by a source placed between the two mirrors or may be illuminated by light passing into the aperture.

It is therefore a general object of the invention to provide an effective and theftproof optical arrangement for creating a real image in space.

Other objects, advantages and features of the invention will be apparent in the following description and claims considered together with the drawings forming an integral part of this specification, and in which:

Figure 1:
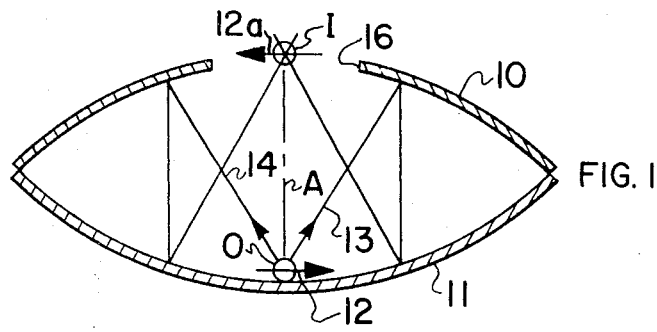
FIG. 1 is a sectional view through a pair of mirrors embodying the invention and showing ray traces of light from an object to a real image.
Figure 2:
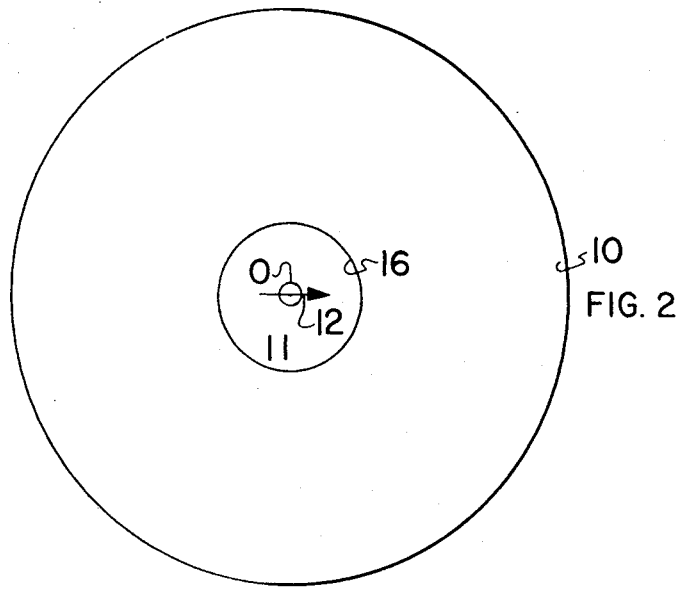
FIG. 2 is a plan view of the top mirror of FIG. 1.

Referring to FIGS. 1 and 2, there is illustrated a pair of concave mirrors 10 and 11 having their concave sides facing each other. These mirrors are formed as a surface of revolution about an optical axis A. Disposed on or near the surface of the bottom mirror 11 and near the optical axis A is an object O whose orientation is indicated by an arrow 12. Light rays 13 and 14 emanate from this object O, strike the reflecting surface of the mirror 10 and are, in turn, reflected down against the bottom mirror 11, and these rays then converge at an image I near a central aperture 16 formed in the top mirror 10. The image I has a left-right reversal from that of the object O, as indicated by the arrow 12a.

Figure 3:
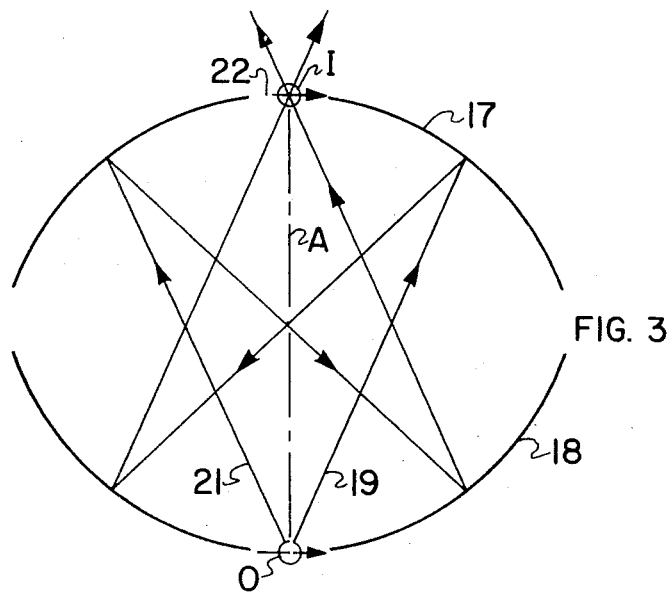
FIG. 3 is a sectional schematic view of a modified form of the invention, wherein the left-right orientation of the image is the same as the object.

Referring to FIG. 3, there is illustrated a pair of mirrors 17 and 18 of somewhat greater curvature than those of FIG. 1, and these also may be surfaces of revolution about an axis A. An object O disposed on the bottom mirror 18 has light rays 19 and 21 radiating therefrom, which strike the apertured mirror 17 and, in turn, are reflected downwardly; but on the opposite side of the optical axis A from the first reflection. These rays 19 and 21 converge at the region of an aperture 22 in the mirror 17 to form an image I that has the same left-right orientation as the object O, as indicated by the associated arrows passing through the object and the image. The mirrors 17 and 18 may have any desirable spacing, depending upon the exact location desired for the image with respect to the aperture 22.

Figure 4:
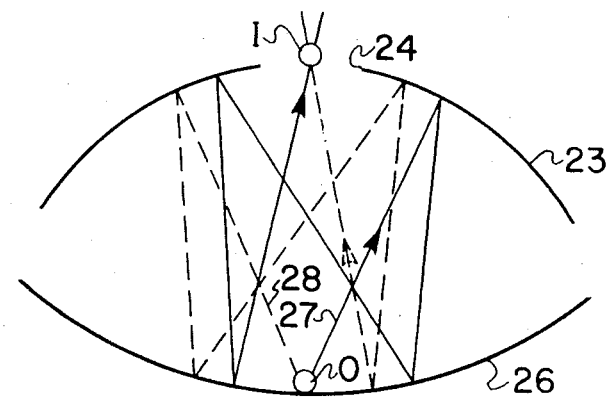
FIG. 4 is a sectional schematic view of still another modified form of the invention, wherein there are more than two reflections of any one light ray eminating from the object.

Referring to FIG. 4, there is illustrated a modified form of the invention, wherein there are more than two reflections of any one ray. A mirror 23 may have an aperture 24 therein and spaced from this mirror 23 is another concave mirror 26. An object O disposed adjacent to the bottom mirror 26 has a solid ray 27 emanating therefrom, as well as a ray 28 indicated by a broken line. Both rays make two or more reflections on at least one of the surfaces and converge to form an image I in the area of the aperture 24.

Figure 5:
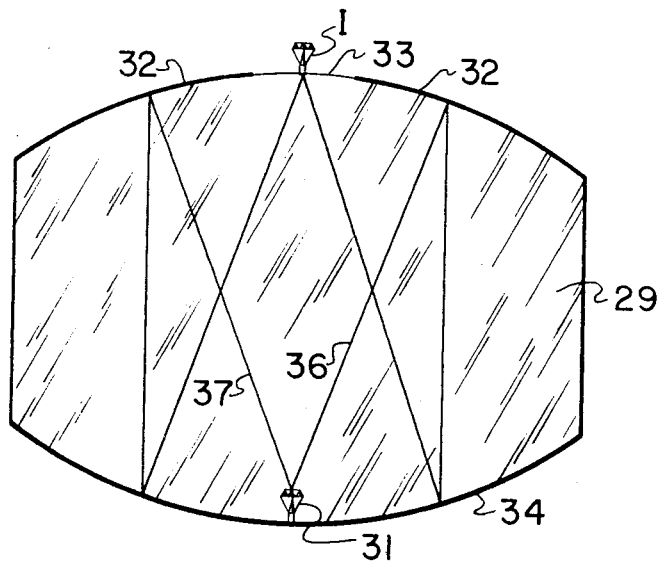
FIG. 5 is an illustration of the invention as applied to a solid figure of revolution that has been cut in half, wherein an object is imbedded in the solid and the image appears above the surface of the solid.

Illustrated in FIG. 5 is an application of the invention to a solid 29 of transparent material, such as glass or acrylic resins, and for purposes of illustration a solid of revolution has been cut in two to present a flat surface in FIG. 5. Imbedded in the solid 29 is an object 31 of any desired type, and for purposes of illustration it is shown as a faceted jewel stone. The top surface of the solid 29 is silvered or otherwise provided with a mirror surface as at 32, and a central portion 33 remains clear and unsilvered. The bottom surface 34 is also silvered. Emanating from the object 31 are light rays 36 and 37 which strike the mirror surface 32, are reflected downwardly to strike the mirror surface 34 and then converge at I to form an image of the object 31.

Figure 6:
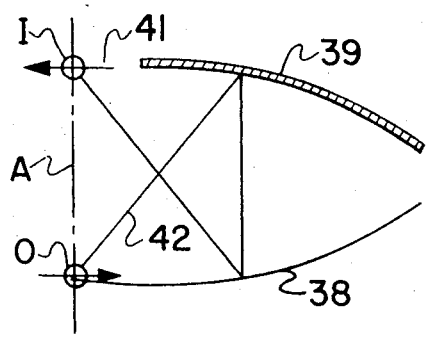
FIG. 6 is a sectional view of a modified form of the invention as it applies to mirrors which are sectors of surfaces of revolution.
Figure 7:
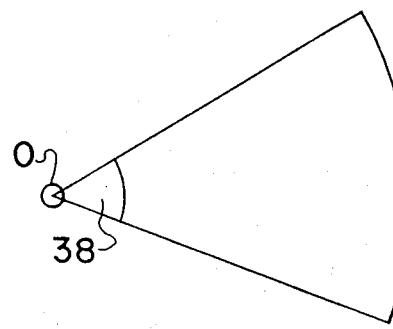
FIG. 7 is a plan view of the mirror pair of FIG. 6.

Illustrated in FIGS. 6 and 7 is a modification of the invention as applied to sectors of a surface of revolution, rather than full 360° surfaces or a semicircular surface as shown in FIG. 5. A bottom mirror 38 in the form of a sector is spaced from a top mirror 39 which has a portion removed from an area near an optical axis for both surfaces 39 and 38. This removed area accordingly acts as an aperture 41. An object O placed on the lower mirror 38 has a ray 42 which reflects off of the top mirror 39 and is reflected again off of the bottom mirror 38 where it converges with other radiating rays (not shown) to form an image I in the region of the aperture 41. Such an arrangement could be used when only one side of the object is to be viewed. A full image could be produced if the sectors were rotated around the optical axis A. If the sectors are rotated at a frequency which is less than the critical flicker frequency of the human eye, the image will flicker, i.e., appear and disappear. If the sectors are rotated at a frequency greater than the critical flicker frequency, the image will not flicker.

Figure 8:
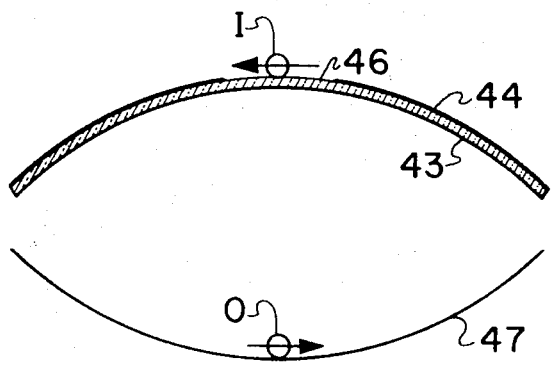
FIG. 8 is a modified form of the invention, wherein the optical hole or aperture is an unsilvered portion of a mirror formed of glass or other transparent material.

Illustrated in FIG. 8 is a pair of mirrors wherein the aperture is an unsilvered part of a continuous mirror with no central hole through it. In that figure, an upper mirror 43 is continuous with no central hole through it and has a reflecting mirror surface 44 disposed on one side of the mirror, but not in a central region 46 which acts as a clear glass window. A bottom mirror 47 is spaced from the top mirror 43 and an object O is disposed near the bottom of this mirror and near the optical axis of the mirror pair. An image I will be formed at the region of the window 46 and may be above or below or appear inside of the material of the window 46. Because of the fact that there is no open hole in the mirror pair of FIG. 8 and the hole is rather an optical hole, it is not possible for a person to reach through the mirrors to obtain the object O. The spacing between the mirror edges may be suitably encased by structure, not shown, to prevent entry and removal of the object from this area.

Figure 9:
FIG. 9 is a sectional view through a modified form of the invention, wherein a transparent sheet is interposed between a physical aperture in the top of the mirror and the object, so that the object will be protected from theft.

Illustrated in FIG. 9 is another arrangement of parts to prevent removal of an object from the mirrors. In that figure, an upper mirror 51 may be formed of polished metal and may have a central aperture 52 therein below which is placed an object O such as a valuable jewel or gem stone. The object may rest upon a bottom mirror 53 and disposed between the two mirrors may be a sheet 54 of transparent material such as glass. The three items of mirrors 51 and 53 and sheet 54 may be suitably fastened together in a housing (not shown). The transparent sheet 54 prevents a person from physically obtaining the object O by reaching through the aperture 52. The transparent sheet 54 in no way interferes with the formation of a real image at the vicinity of the aperture 52. If the bottom mirror 53 has a removable center portion 50, objects to be displayed may be changed without taking apart the whole assembly.

Figure 10:
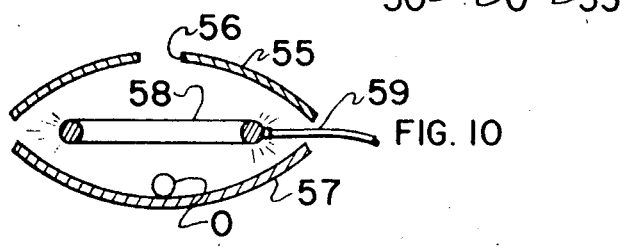
FIG. 10 is a schematic diagram of a pair of mirrors embodying the invention, wherein there is illumination provided between the mirrors for an object.

Illustrated in FIG. 10 is a pair of mirrors, wherein there is internal illumination. This permits use of the display device in a room which may otherwise be totally dark or may have very low illumination. An upper mirror 55 may have an optical aperture 56 therein and spaced therefrom is a lower mirror 57 near which is disposed an object O. Disposed between the mirrors and out of the projection of the optical aperture 56 is a light source 58 which may be of any suitable shape, and there is illustrated a ring type of light which may be either of incandescent filament type of fluorescent type. A conductor 59 supplies electrical energy to this light. Such internal illumination results in very dramatic display of the object O in a room of very low illumination. It will be appreciated by those skilled in the art that if the object O is itself a source of illumination, such as the flame of a candle or an electric light bulb, then there is no need for additional illumination.

Various modifications and variations will occur to those skilled in the art. Ordinarily the illumination from a room in which the display device is located is sufficient to properly illuminate the object. Because the ray traces are reversible, the object can be illuminated by directing the light at the image from any point at which the image is visible. Such a lighting scheme enhances the observer's feeling that the object is really there. The solid aperture of FIG. 8 may be very effectively used when that aperture is semifiltered. This, of course, requires strong illumination of the object O, but it produces an image wherein the viewer has less likelihood of seeing to the interior between the mirrors. The object may be moved away from the optical axis by any desired amount, but when it crosses the projection of the optical aperture, then those parts beyond the optical aperture projection become invisible. The object is quite readily visible up to this limit of movement. The object may be moved away from the surface of the mirror against which it is placed, and this merely moves the location of the image. The exact amount of movement which can be tolerated and still give an effective image depends upon the curvature of the mirrors and their spacings. As mentioned previously, the image may appear at the aperture, may appear above it, or may appear slightly below it. It is most effective, of course, when it appears just above the aperture area. The area directly below the top aperture need not be a mirror, but can be any material, such as red velvet. This material will also image at the aperture of the top mirror and, if the mirrors are spaced properly will appear to form a continuous surface with the top mirror. Best results are obtained when the size and shape of the material placed below the object are the same as the size and shape of the aperture in the top mirror. A removable bottom section aids in this use of velvet.

The mirrors may be formed of any desired material, such as polished metal, "silvered" metals, "silvered" materials that are transparent such as plastic or glass, or any other highly reflective surface. The types of curves are not important as long as they produce an image. Parabolic curves, spherical curves and ellipsoidal curves, and curves approximating these have proven to be highly satisfactory. Other curves are equally satisfactory, the only requirement being that the rays are focused to form an image. The spacings may be any desired between the mirrors, and this, of course, is a function also of the curvatures. Empirical spacings are established in a few seconds by merely moving the mirrors manually with respect to each other, or the object with respect to the mirrors.

While the apertures have been shown in an upper mirror in the drawings, it is obvious that the entire device may be reversed or may be placed on its side or any other angle without affecting the optical performance in any way. With respect to the solid of FIG. 5, the object may be molded into the solid when it is formed, as by casting a plastic resin, or may be inserted through a hole formed in the solid, or any other technique may be used. The image may be larger than the object or smaller than the object, depending on the relative curvature of the two mirrors. If the curvature of the apertured mirror is greater than the other, then there is magnification. If the apertured mirror is flatter than the other mirror, then the image is smaller than the object. The limit of magnification appears to be about two. In any event, there is no need for the mirrors to be identical.

Various other modifications and variations will occur to those skilled in the art, and all such modifications and variations that fall within the true spirit and scope of the invention are included within the scope of the following claims.

We claim:

1. An optical display device having an optical axis comprising:
   a. a concave first mirror formed as a surface of revolution of a curved line about said axis;
   b. a second mirror formed as a surface of revolution about said axis and spaced from said first mirror on the concave side thereof and concave toward the first mirror;

characterized by one of said mirrors being optically apertured about said optical axis, the other of said mirrors having a continuous reflecting surface, the mirror curvatures being such that light rays from an object placed near that optical axis and near the other mirror will strike the one mirror, be reflected onto the other mirror and thereafter converge near the aperture to form a real image in the vicinity of the aperture, and a source of illumination is provided to illuminate the object to thereby enhance the brightness of the real image.

2. An optical display device as set forth in claim 1 wherein the optical aperture is a physical hole in the one mirror and a transparent sheet is disposed between the mirrors to prevent removal of the object through the aperture hole.

3. An optical display device as set forth in claim 1 wherein the optical aperture is a transparent piece of material and protects the object from ready removal.

4. An optical display device as set forth in claim 1 wherein said source of illumination is disposed between the mirrors.

5. An optical display device as set forth in claim 1, wherein the region between the concave mirrors is filled with a transparent material.

6. An optical display device as set forth in claim 1, wherein the mirror not apertured has a removable portion in the area of the axis to assist in placing objects between the mirrors.

* * * * *